(12) United States Patent
Bimson et al.

(10) Patent No.: US 12,086,392 B2
(45) Date of Patent: *Sep. 10, 2024

(54) SYSTEM AND METHOD FOR CONTENT MANAGEMENT

(71) Applicant: Torrential Data Solutions, Inc., Virginia Beach, VA (US)

(72) Inventors: Bradford D. Bimson, Virginia Beach, VA (US); Christopher W. Griffin, Suffolk, VA (US); Daniel V. Griffin, Virginia Beach, VA (US); Gary Scopel, Chesapeake, VA (US); David W. Torbert, Chesapeake, VA (US)

(73) Assignee: Torrential Data Solutions, Inc., Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,403

(22) Filed: Jan. 16, 2023

(65) Prior Publication Data

US 2023/0393713 A1 Dec. 7, 2023

Related U.S. Application Data

(63) Continuation of application No. 14/722,264, filed on May 27, 2015, now Pat. No. 11,556,228, which is a continuation of application No. 13/842,459, filed on Mar. 15, 2013, now Pat. No. 9,046,993.

(60) Provisional application No. 61/622,285, filed on Apr. 10, 2012.

(51) Int. Cl.
*G06F 3/0481* (2022.01)
*G06F 3/0482* (2013.01)
*G06F 3/0484* (2022.01)
*G06F 16/44* (2019.01)
*G06Q 10/06* (2023.01)
*G06Q 10/10* (2023.01)

(52) U.S. Cl.
CPC .......... *G06F 3/0484* (2013.01); *G06F 3/0482* (2013.01); *G06F 16/44* (2019.01); *G06Q 10/06* (2013.01); *G06Q 10/10* (2013.01)

(58) Field of Classification Search
CPC ....................................................... G06F 3/0484
USPC ......................................................... 715/771
See application file for complete search history.

(56) References Cited

U.S. PATENT DOCUMENTS 7,275,063 B2 * 9/2007 Horn
8,417,357 B2 * 4/2013 Husoy et al. ................... 700/17
9,046,993 B2 * 6/2015 Bimson ................. G06Q 10/06

(Continued)

OTHER PUBLICATIONS

Reza Nabi, "A Service Oriented Crop Profitability Simulator realizing with Web Services", available at <http://cis895.nabi.us>, published on May 2010, 147 pages. (Year: 2010).*

*Primary Examiner* — Reza Nabi
(74) *Attorney, Agent, or Firm* — Toering Patents PLLC

(57) ABSTRACT

A content management system and method work as a companion to other applications that control the system. The system and method draw information from the operations or structure of the controlling application to display and manage the content objects relevant to a record displayed by a user of the controlling application and stored in the content management system. The system and method operate in conjunction with the controlling application so that this management and display of content objects is dynamic, real-time, and context-sensitive for the user.

18 Claims, 12 Drawing Sheets

(56) References Cited

U.S. PATENT DOCUMENTS

| | | | |
|---|---|---|---|
| 2002/0113816 A1* | 8/2002 | Mitchell et al. | 345/734 |
| 2002/0116417 A1* | 8/2002 | Weinberg et al. | 707/517 |
| 2002/0149602 A1* | 10/2002 | Redpath et al. | 345/629 |
| 2004/0085367 A1* | 5/2004 | Hagarty, Jr. | 345/854 |
| 2007/0172062 A1* | 7/2007 | Waldo et al. | 380/252 |
| 2008/0299960 A1* | 12/2008 | Lockhart et al. | 455/418 |
| 2010/0114337 A1* | 5/2010 | Husoy et al. | 700/17 |
| 2011/0088011 A1* | 4/2011 | Ouali | 717/105 |
| 2012/0029930 A1* | 2/2012 | Calle et al. | 705/2 |
| 2012/0278015 A1* | 11/2012 | Budhraja et al. | 702/62 |
| 2013/0117652 A1* | 5/2013 | Folsom et al. | 715/222 |
| 2013/0185258 A1* | 7/2013 | Bestler et al. | 707/638 |
| 2013/0185642 A1* | 7/2013 | Gammons | 715/733 |
| 2014/0019587 A1* | 1/2014 | Giladi | 709/217 |
| 2014/0214902 A1* | 7/2014 | Mehta et al. | 707/803 |
| 2017/0235800 A1* | 8/2017 | Poston | G06F 17/30554 707/722 |

\* cited by examiner

| ID | PARENT | FOLDER TYPE | CAPTION | FUNCTION |
|---|---|---|---|---|
| 1 | (NONE) | 0 | [NAME] | |
| 2 | 1 | 0 | VENDOR DOCUMENTS | |
| 3 | 2 | 2 | (NONE) | |
| 4 | 1 | 0 | PURCHASE INVOICES | |
| 5 | 4 | 1 | YYYY | getDocumentYears |
| 6 | 5 | 2 | INVOICE [NUMBER] ([DATE]) | getDocumentsForYear |
| 7 | 1 | 0 | PURCHASE ORDERS | |
| 8 | 7 | 2 | PURCHASE ORDER [NUMBER] | getPurchaseOrders |

FIG. 3b

| FOLDER TYPE | MEANING |
|---|---|
| 0 | DISPLAYS A SINGLE FOLDER. |
| 1 | DISPLAYS A "FOLDER FILTER" – A LIST OF FOLDERS THAT FILTER RELATED CONTENT OBJECTS, FOR EXAMPLE, A LIST OF YEARS THAT CAN BE EXPANDED TO SHOW INVOICES FOR EACH YEAR. |
| 2 | DISPLAYS CONTENT OBJECTS ASSOCIATED WITH THE CURRENT RECORD. |

FIG. 3c

| ID | PARENT | FOLDER TYPE | CAPTION | FUNCTION |
|---|---|---|---|---|
| 1 | (NONE) | 0 | [NAME] | |

FIG. 4A

| ID | PARENT | FOLDER TYPE | CAPTION | |
|---|---|---|---|---|
| 2 | 1 | 0 | VENDOR DOCUMENTS | |
| 4 | 1 | 0 | PURCHASE INVOICES | |
| 7 | 1 | 0 | PURCHASE ORDERS | |

FIG. 4b

| ID | PARENT | FOLDER TYPE | CAPTION | FUNCTION |
|---|---|---|---|---|
| 5 | 4 | 1 | YYYY | getDocumentYears |

FIG. 4c

| ID | PARENT | FOLDER TYPE | CAPTION | FUNCTION |
|---|---|---|---|---|
| 3 | 2 | 2 | (NONE) | |
| 6 | 5 | 2 | INVOICE [NUMBER] ([DATE]) | getDocumentsForYear |
| 8 | 7 | 2 | PURCHASE ORDER [NUMBER] | getPurchaseOrders |

SYSTEM AND METHOD FOR CONTENT MANAGEMENT

CROSS-REFERENCE TO RELATED APPLICATIONS

This Application is a continuation application of U.S. patent application Ser. No. 14/722,264, which was filed on May 27, 2015, entitled "System and Method for Content Management," now issued as U.S. Pat. No. 11,556,228, which in turn is a continuation application of U.S. patent application Ser. No. 13/842,459, which was filed on Mar. 15, 2013, entitled "System and Method for Content Management," now issued as U.S. Pat. No. 9,046,993; which in turn claims priority to U.S. Provisional Application No. 61/622,285, entitled "System and Method for Content Management," which was filed on Apr. 10, 2012. Each of the foregoing applications is incorporated herein by reference in its entirety.

STATEMENT REGARDING GOVERNMENT SUPPORT

None.

BACKGROUND

Field of the Invention

The present system relates to content management technologies and, more particularly, technologies that integrate with controlling applications to provide content presentation and other content management functionality in the context of the user experience within the controlling application.

Description of the Related Art

Physical documents as well as electronic documents and other content objects such as email, audio, video, etc., that themselves serve as business records or that relate to other business records may be located throughout an organization. Such items may be located in boxes, filing cabinets, email inboxes, file systems, databases, and in other storage repositories. Such items often drive business processes and are critical not only to the value propositions of an organization, but also to its legal and regulatory compliance and internal policy compliance and governance requirements. The physical nature of documents causes a wide variety of issues for organizations that slow down processes because the documents cannot be located in more than one place at one time, high volumes are difficult to manage, process and store, they are susceptible to environmental damage, and often need to be viewed by more than one person at one time. Even electronic documents and other content objects, if not properly managed, can present the same logistical issues as physical documents. One such example is the difficulty in determining whether or not an electronic file is the original. This is often encountered when many recipients receive the same email with an attachment, or when the same file is stored multiple times on a file system under different directories with different names. Considered collectively, these issues compel organizations to implement document management and enterprise content management (ECM) systems that attempt to solve these and other core issues.

ECM systems help users capture, manage, access, view, secure, collaborate on, store and dispose of content objects relating to business records. ECM features and functions are designed to facilitate fast and efficient processing of a content object, to help identify the actual business records, and to access and store the content objects until their retention time has lapsed.

An ECM system may be considered as a stand-alone application or as a companion to an underlying business system in areas such as payment processing, billing systems, security, service management, sales, resource planning, human resource management, customer relationship management, manufacturing, forms automation, or business intelligence. When an ECM system is operable as a companion to an underlying business system, then the underlying business system may be considered a 'controlling' application in the sense that the underlying business system in some way directs or 'controls' the actions, behaviors, and display of the ECM system's functionality in a manner that is intended to enhance or improve the use of the underlying business system.

For example, traditional ECM systems address content management needs by inducting both the content object and the business system's data into the ECM system's own storage repository, thereby duplicating the business system's data. The result is an ECM system that is largely disconnected from the business system and that requires frequent data synchronization of, and batch data processing between, the ECM system and the business system. Careful planning and constant management is needed to minimize mistakes caused by incorrect or untimely data synchronization of the ECM system and the business system. This disconnected environment requires extra labor resources to perform manual processes to review synchronization log files, determine the occurrence of both success and failure events, and resolve errors associated with failure events.

A more recent approach of some ECM systems has been to embed links and buttons into a business system and to display a list of content objects when the button is clicked. In a simple approach, clicking the button or link will launch a user interface to show all content objects available. In a more sophisticated approach, clicking the button or link will show a limited set of content objects directly related to the record displayed on the screen. Both of these methods produce satisfactory results for users searching for content objects in business environments with lower volumes and/or lower complexity. As volume and/or complexity increases, certain requirements related to security, user training costs, and the ability to show various interrelationships among content objects and records in other business systems, lead organizations to seek a more flexible and sophisticated approach.

SUMMARY

The present system and method for content management works with other applications as one or more controlling applications. The system and method draw information from the operations or data structure (including relationships among the data records) of the controlling application. This permits the present system and method to display and manage the content objects required by users of a controlling application in a logical versus a physical manner. For example, an aspect of embodiments herein permits the visualizing of content objects, related directly or indirectly to the record that the user is currently viewing, within a logical folder structure or hierarchy. The system and method operate in conjunction with the controlling application so that this management and display of content objects is dynamic, real-time, and context-sensitive for the user and the systems.

BRIEF DESCRIPTION OF THE DRAWINGS

FIG. 3b is an illustration of sample folder structure.

FIG. 3c is an illustration of an example of display folder types.

FIG. 4a-e illustrates steps for creation of a sample display of a dynamic folder structure, with such a sample shown in FIG. 4e.

DETAILED DESCRIPTION

General

Figure 1:
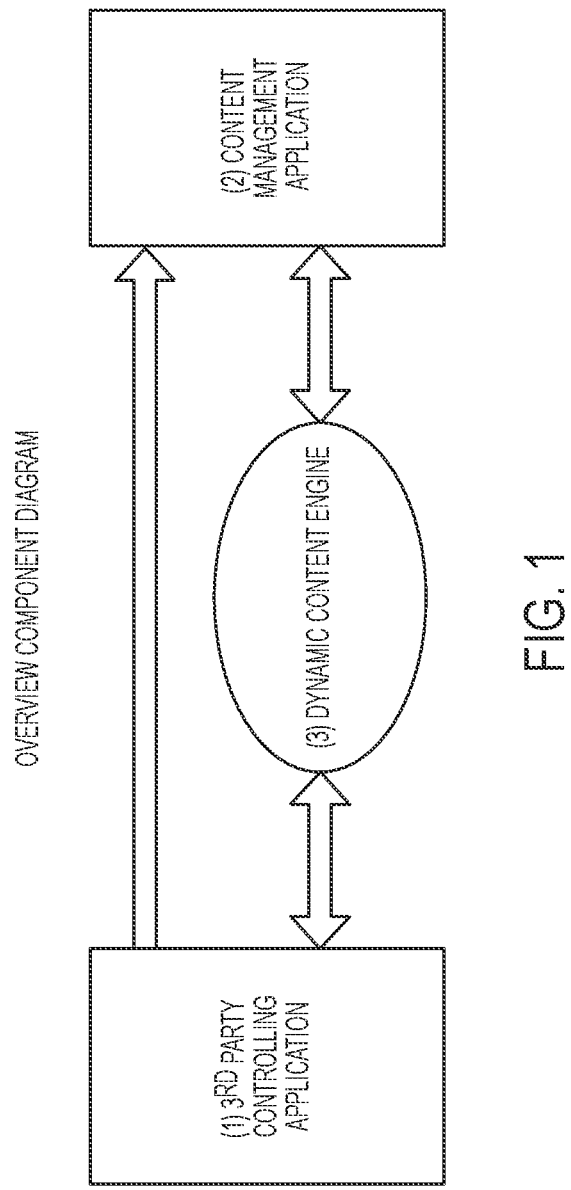
FIG. 1 is an overview of the components of an embodiment of the system.

The present system and method permit the display and management of content objects required by users of a controlling application in a logical versus a physical manner by transforming information from the controlling application into hierarchies, relationships, etc. This permits users to be more effective in accessing and working with content objects related directly or indirectly to an underlying process or system record.

A system or method is described having a dynamic content engine for visualizing electronic content objects within a logical folder structure or hierarchy. This representative hierarchy may be created dynamically and in real-time based on actual or live data from a controlling application. The dynamic content engine includes an interface layer and a token based macro language that interpret the controlling application's data model to display content objects, in a hierarchal view that can be embedded inside of a screen displayed by the controlling application, and naming conventions for each desired content object and folder structure to display. The controlling application may be a custom developed system, an off-the-shelf system, or a combination of the foregoing systems, any of which would be used as a companion to the present system or method. For clarity, it may be referred to as a controlling application for illustration of utility, but need not be so limited.

The term logical is meant to convey a value association or relationship other than storage location or conventions. Logical, for example, might mean that there is an underlying procedural association or functional relationship as distinguished from a hierarchical series of directories and subdirectories representing actual or physical storage and retrieval conventions.

The term system is intended to encompass processes, hardware and software specifically configured to execute certain steps, whether distributed or integrated, networks, programs, tools, methodologies, or other concepts having the particular elements, devices, components, steps, etc., described herein and implemented in any of a variety of embodiments. Embodiments involving hardware may generally include interconnection or communication structure or links enabling such interconnection, and should be construed to include local networks, wide area networks, the internet, etc.

One embodiment of a dynamic content engine may use a method of stored links having primary key information from both a controlling application and the content management system, coupled with a token-based syntax used to retrieve content objects and dynamically create the structure and naming of folders and content objects, while applying the user's location/context within the controlling application to derive the final display.

Yet another embodiment of the dynamic content engine may combine more contextual information which could include user group membership and/or individually assigned security permissions (for folder and document access) and privileges (for available actions to perform on the folders and content objects) plus the aforementioned display structure.

Referring to FIG. 1, aspects or components in overview may include a controlling application (1) (such as an ERP, CRM, or other data-centric application and/or storage repository), a content management application (2), and a dynamic content engine (3) responsible for automatically and dynamically organizing content of the content repository into folders based on controlling application data, and displaying content objects to the user in these folders in context with the controlling application record. In other words, the data corresponding or relating to content, documents, files, forms, procedures, rules, process steps, etc., are transformed dynamically into a logical structure that enhances the user experience and the implementation of the underlying processes.

Figure 2:
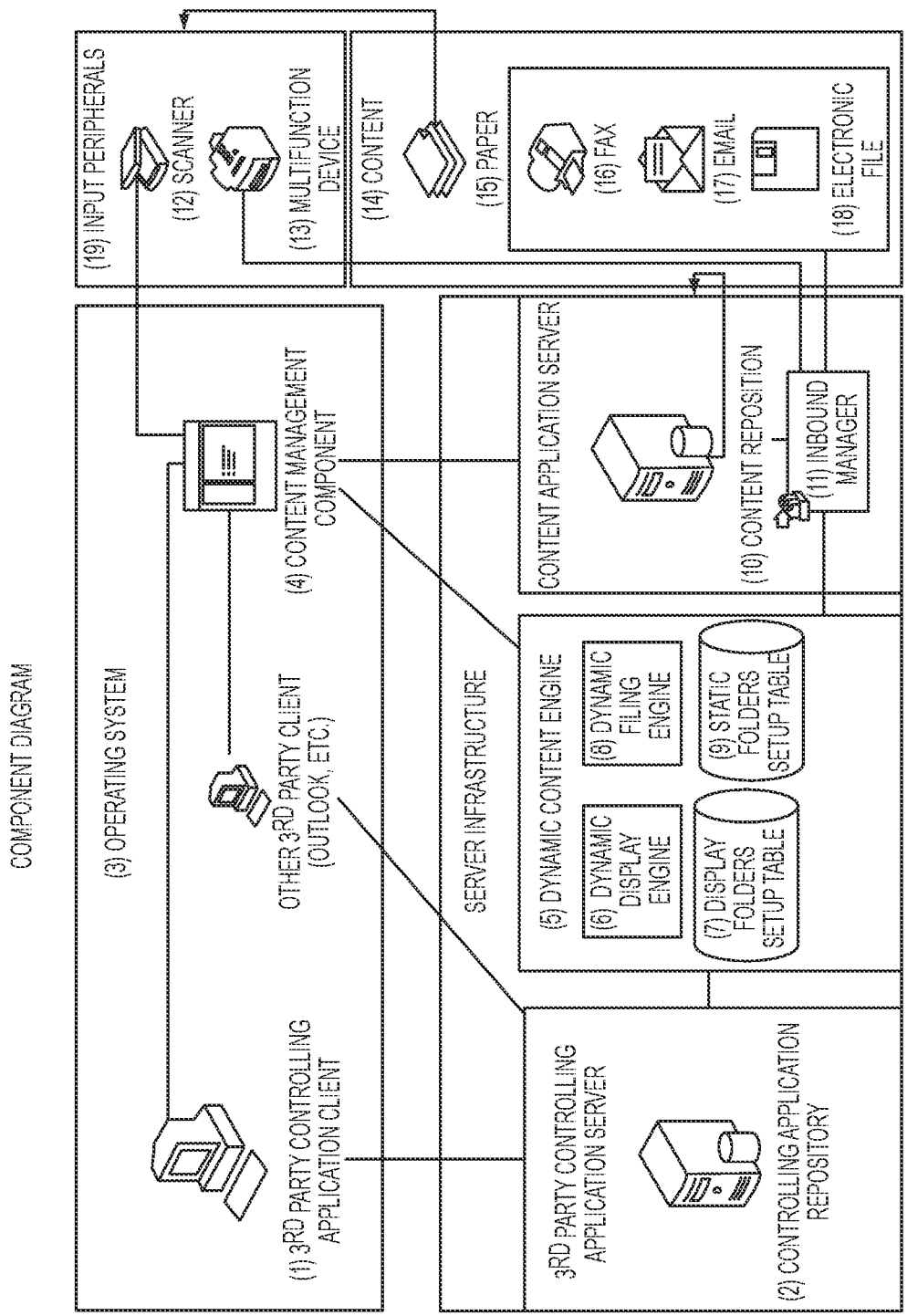
FIG. 2 is a detail of the components of an embodiment of the system.

FIG. 2 is a component diagram illustrating how users may access records stored in a controlling application repository (2) from their operating system (3) using a controlling application client (1). This client can run directly on the operating system as an installed application, or as a hosted application running from a web browser or other conduit application. Items shown as "third party" represent the controlling application that may be integrated with or used as a companion to the present system and method for ECM. Embodiments of the present system and method may be implemented by, for example, one or more servers specifically configured for performing the discussed functionality, steps, or other aspects discussed herein, the server operably in communication with other components, including input devices, displays, etc. In some embodiments, components of the present system and method for ECM may be distributed among multiple devices within a network.

As shown in FIG. 2, the controlling application notifies the content management component (4) when users access records in the controlling application repository. The content management component can run as an embedded component that is completely under the control of the controlling application, or as a separate client application that simply receives external commands from the controlling application. As discussed above, the content management component and/or other components discussed may operate on a server specifically configured for this purpose. The notification from the controlling application to the content management application includes primary key information about the record that the user is currently viewing. The content management application receives the notification and accesses the dynamic content engine (5) to determine the appropriate content objects to display, and format for displaying, to the user.

The dynamic content engine receives the request from the content management component, and uses the dynamic display engine (6) to look up the "display commands" stored in the Display Folders Setup Table (7), based on the primary key information from the controlling application. The display commands determine which, pieces of data the content management component will need from the controlling application repository to display content objects to the user. Once the dynamic content engine determines the data needed, it looks up the data from the controlling application repository. This lookup can occur through a direct database query or through other, "best practice" methods of obtaining data from the controlling application repository, like web services. The dynamic content engine uses or transforms the data to determine the dynamic folder structure and related content objects from the content repository (10) that the content management component should display to the user. From there, the dynamic content engine passes this information back to the content management component, which populates the user interface in the content management component to allow users to access content objects related to the current record. In some embodiments of the system, the dynamic content engine may provide for and enforce security policies consistent with or in addition to those of the controlling application.

The dynamic content engine may also be used for logical filing of content objects. Content objects (14) come into an organization in many formats, including, but not limited to paper (15), faxes (16), emails (17), and electronic files (18). An input peripheral (19) may convert paper content to an electronic format. Examples of input devices or peripherals include scanners (12), multi-function devices (13) with scanning capability, or any other input hardware or device that can transform paper into an electronic file format. Certain scanners or other input hardware can interface or communicate directly, sometimes by network, with the content management component to import paper content into the content management repository and associate the resulting content object with a record in the controlling application. The Inbound Manager application (11) handles importing a content object that originates through multi-function devices, faxes, emails, and electronic files. When a content object is associated with a controlling application record by the dynamic content engine, the content management component again passes primary key information about the current record of the controlling application to the dynamic content engine. This time, the dynamic content engine uses the dynamic filing engine (8) to determine the appropriate action. The dynamic filing engine may use the static folders setup table (9) to determine the appropriate data to retrieve from the controlling application repository. The dynamic filing engine retrieves this data from the controlling application repository and returns it to the content management component, which automatically and dynamically names the new content object and associates it with the current record displayed by the controlling application based on primary key information for the current record displayed by the controlling record which record is associated, in turn, with other records in the controlling application according to the data model of the controlling application.

Figure 3A:
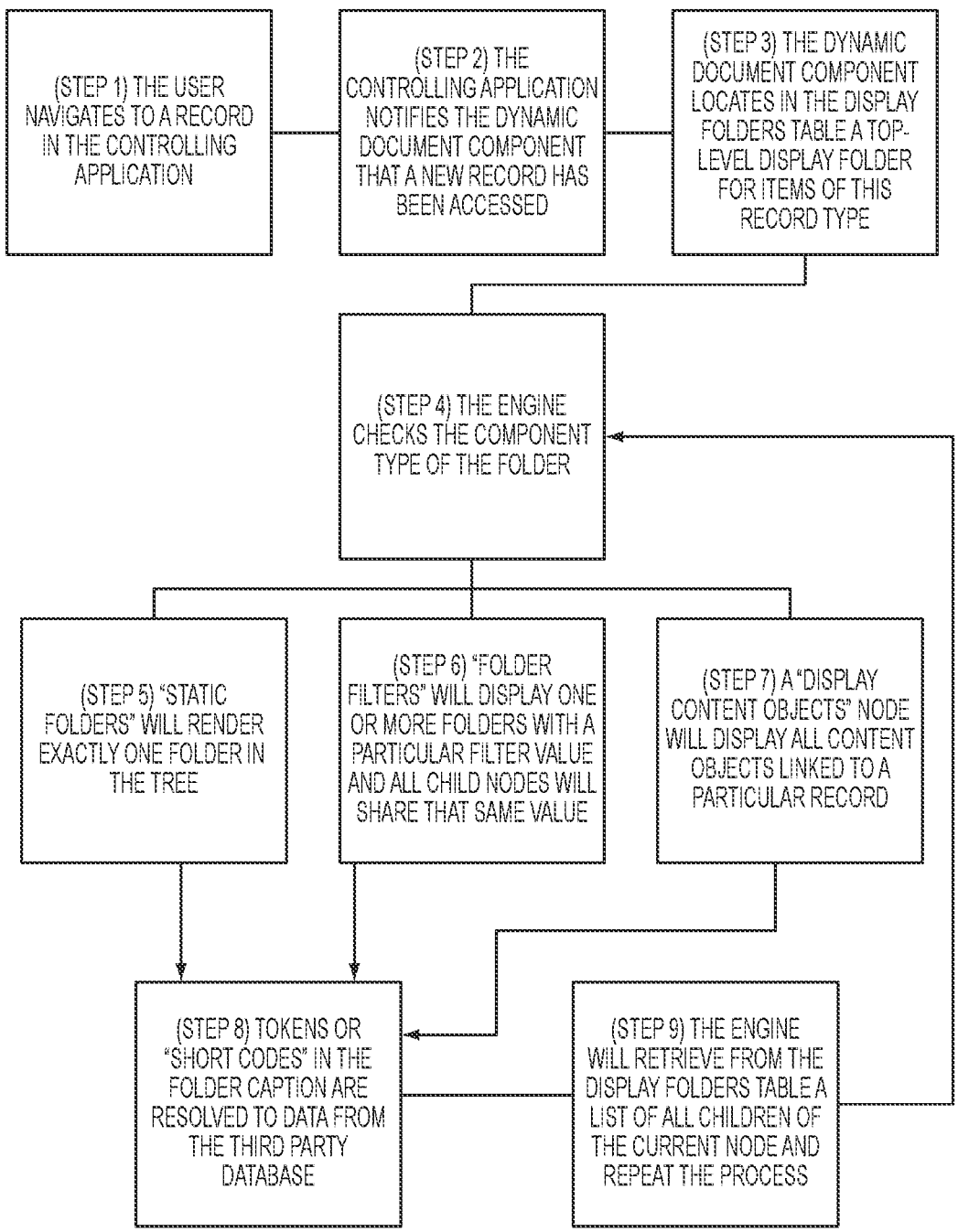
FIG. 3a is an illustration of a process of embodiments of the system.

FIG. 3*a* illustrates a sample process flow of an embodiment of a dynamic content engine. Logical folders may be generated dynamically at runtime using the dynamic content engine by accessing data from a the storage repository of the controlling application and transforming it as follows. When the user navigates to a record in the controlling application (Step 1), that application's extensibility functionality is used to pass the record type and record ID to the dynamic document component (Step 2). The exact information passed may vary from controlling application to controlling application, but is typically a table ID and a unique identifier or "primary key." For example, in an ERP system as a controlling application, the record type might be a numerical ID that indicates whether the record or document is a vendor, an invoice, or a purchase order, and the primary key might be a vendor ID, invoice number, or purchase order number.

FIG. 3*b* illustrates a sample folder structure table. The dynamic content engine may then locate in its display folders table (FIG. 3*a*) a row corresponding to the top-level folder for this record type (Step 3). As shown, there may be one row for each folder or group of folders that will be expanded to form a hierarchical tree of logical folders containing content objects. The dynamic content engine checks to see the type of the display folder (Step 4) and then adds one or more folders to the display interface according to its folder type. As noted above, this hierarchy is logical, and does not represent actual file location.

FIG. 3*c* illustrates a sample display folder types table. Static folders (Step 5), type 0, are folders with no specific functionality. "Folder filters" (Step 6), type 1, show a list of folders that "filter" the results according to a certain parameter. For example, a filter on 'invoice year' might result in folders being generated for 2010, 2011, 2012, etc. "Display content objects" nodes (Step 7) will display all content objects that correspond to either the current record or to the requested filter. The display content objects row may contain the name of a web services function that is called to retrieve related content objects. This function, which is customized for each need, will return a list of related records for which content objects are displayed.

Figure 3D:
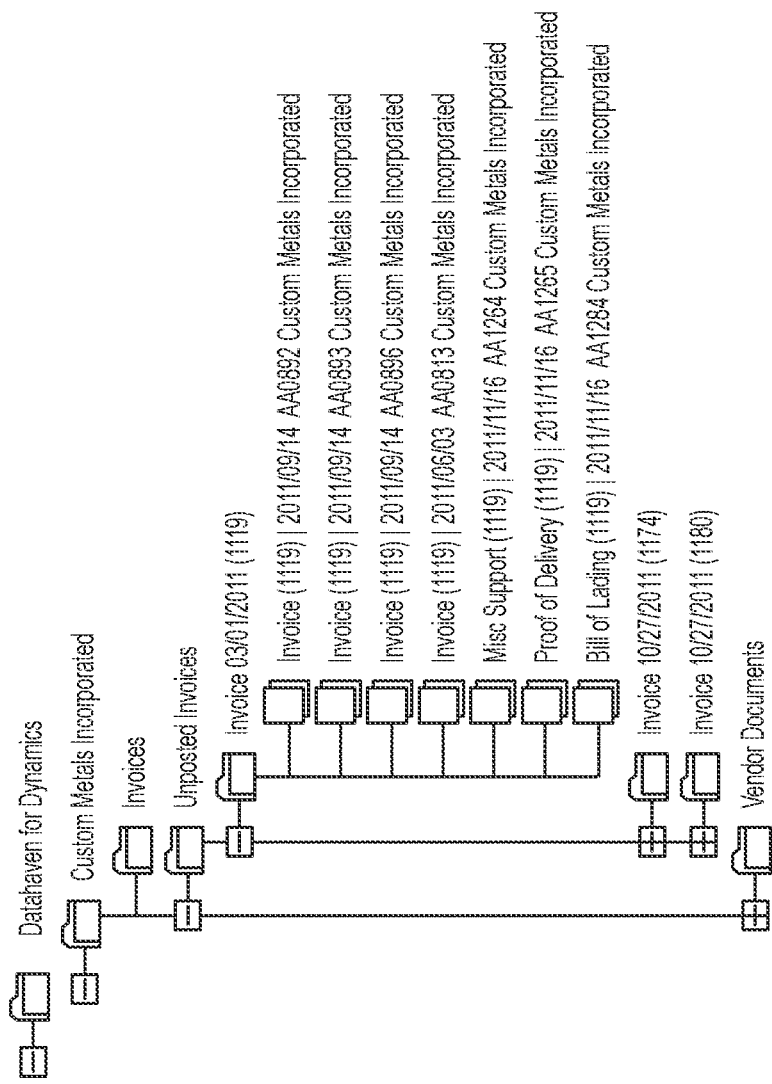
FIG. 3d is an illustration of an example of display of dynamic folder structures.

For each folder, the caption may contain "short codes", or "tokens." Tokens may be resolved at run-time to data from the storage repository of the controlling application using web services (Step 8), for example. After a node is added to the folder display, the dynamic content engine may then look for any rows in the display folders table whose parent node is the current node (Step 9) and repeat the process. FIG. 3*d* is a sample display of a dynamic folder structure resulting from such steps. The content objects displayed in the "Invoice 03/01/2011 (1119)" folder all hold a logical relationship meriting their being grouped together within this dynamic display—this direct or indirect relationship may be based at least in part on transformed information drawn from the controlling application. Depending on the underlying processes, the next time this folder is displayed the content objects may be updated or rendered differently based on the state of the underlying processes or other parameters such as security permissions, etc. The user is able to focus immediately on these content objects for their logical purpose within the context of the underlying business process because the dynamic display engine displays to the user only those content objects relevant to the limited portions of the entire current business process without exposing the user to, or requiring the user to sift through, irrelevant portions, and without the likelihood of human error and attendant delay either would cause.

Steps for Setting Up a Display Folders Table

The display folders table may contain a script that the dynamic content engine uses to render a set of folders and content objects related to a particular record from the controlling application.

This table preferably is configured for each controlling application to have a folder structure for each context on which the dynamic content engine will be displayed.

To construct this table, it is beneficial to include:

Methods for resolving tokens to data from the controlling application. For example, the [Name] token in a vendor might be resolved to the Name database column in the vendor table.

Methods for retrieving a list of related records from the controlling application. For example, on a vendor card, methods will be needed to retrieve lists of invoices and purchase orders related to that vendor. These methods might be authored either using the extensibility capabilities of the controlling application (for example, some ERP systems provide the capability to create custom web services, which are then integrated into that ERP system) or they might be authored to connect directly to the storage repository used by this controlling application. (See below for a code sample.)

A list of records that may be related to the particular context. For example, on a vendor form, it may be desirable to show content objects that are not directly linked to the vendor itself, but which are linked to that vendor's invoices and purchase orders.

Below is a sample of coding for a web service in a controlling application that retrieves a list of invoices related to the current record:

```
private tdsDHTmpDocument getVendInvoiceDocuments(RefRecId recId)
{
  tdsDHTmpDocument ret = null;
str s;
VendInvoiceJour jour;
jour.clear();
while select jour
    where jour.RecId == recid
{
  ret.DocuRefRecId = jour.RecId;
  ret.DocuDate = jourinvoice Date;
  ret.DocuId = jour.InvoiceId;
  ret. DocuAccount = jour.InvoiceAccount;
  ret.DocuName = jour.vendName();
  ret.insert();
}
  select ret;
```

To create a display folder structure, one may proceed as follows, with reference to FIGS. 4a-4e:

Add a row for a top-level folder. This folder is typically a static folder (type 0) and may display the name of the linked object. The "caption" may contain short codes or tokens, that will later be evaluated to display data from the controlling application. The table in FIG. 4a is a sample two-level folder.

Now, it is desirable to fill out the folder hierarchy with other content objects related to the record type at hand. For example, a user might add, as children of this top-level folder, static folders where the user will eventually see content objects associated with the record itself, and content objects associated with other related objects. These rows all represent folders that may be desired to display as children of folder ID #1, so their parent is 1, as shown in FIG. 4b.

There may be a need to filter certain related records based on data in the controlling application. For example, get-DocumentYears is a web service that will return a list of years for which an invoice exists for this vendor, as shown in FIG. 4c.

Now, it is possible to display the list of content objects associated with either the current record (3) or one of the related records (6, 8). The two functions—getDocumentsForYear and getPurchaseOrders—are web services in the controlling application that retrieve a list of related records. This is shown in FIG. 4d.

Figures 4D, 4E:
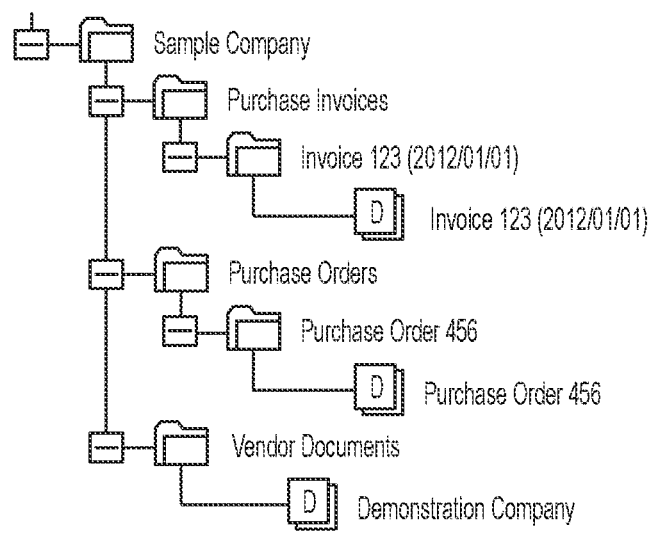

A sample folder and document structure shown in FIG. 4e may be displayed as a result of the foregoing.

Navigating within Controlling Application Using Content

In addition to displaying content based on data from the controlling application, the dynamic content engine provides bi-directional capability to enable navigation to certain records within the controlling application using the content object as the starting point. This navigation can occur either from the content itself or the folder containing the content. The content contains certain information, such as a table and primary key, that links the content to one or more records within the controlling application. The linking information allows the dynamic content engine to look up the record(s) in the controlling application, and cause the controlling application to navigate to and display the appropriate record. In some embodiments, this may be accomplished by obtaining a bookmark URL from the controlling application using a web service and launching the bookmark URL as a process using a "Process.Start" command as would be appreciated.

Figure 5:
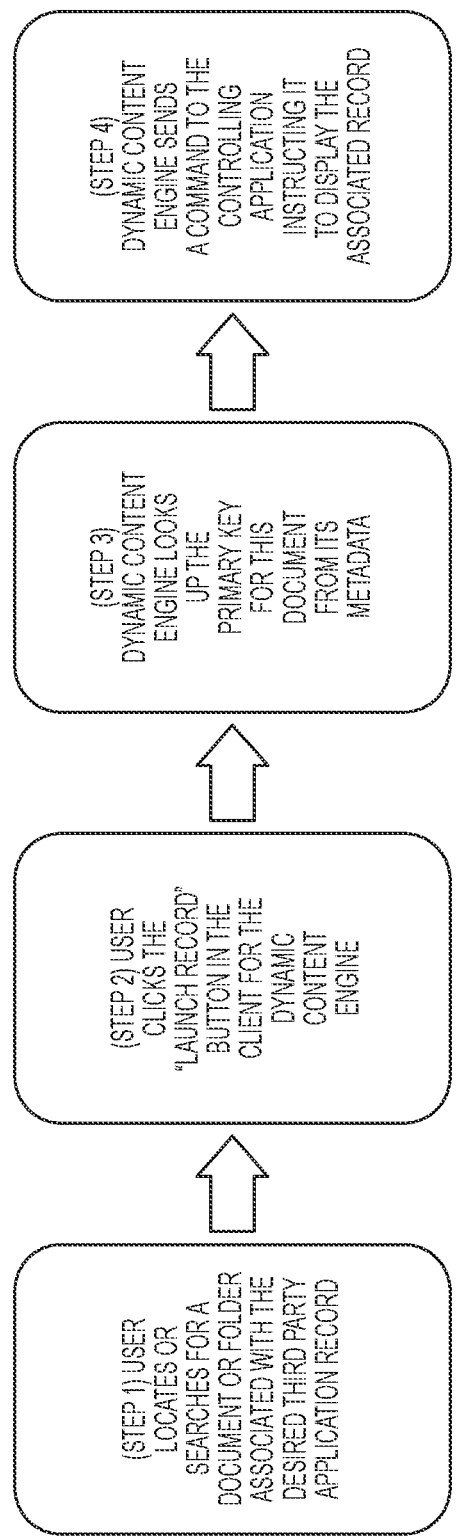
FIG. 5 is an illustration of a process of embodiments of the system.

FIG. 5 illustrates a sample process flow of an embodiment of a dynamic content engine. A user searches for and/or locates a document or folder associated with the desired controlling application record (Step 1). The user selects, for example, the "Launch Record" option from a user interface associated with the dynamic content engine (Step 2). In response, the dynamic content engine looks up the primary key for this document (or folder) from its metadata in the content repository (Step 3). As discussed herein, the primary key links the document (or folder) to the associated record in the controlling application. Once the primary key is obtained, the dynamic content engine determines and sends an appropriate command to the controlling application in order for the controlling application to display the associated record (Step 4). In some embodiments, Step 4 may be accomplished by obtaining a bookmark URL from the controlling application using a web service and launching the bookmark URL as a process using a "Process.Start" command as would be appreciated.

Creating a New Record within the Controlling Application

In some embodiments, the dynamic content engine may include the capability to create a new record within the controlling application when the content object is not already linked to a specific record in the repository of the controlling application. When linking information is not available for a particular content object, the dynamic content engine looks up and displays a list of valid record types from the controlling application for which users can create a new record. After a user selects a record type, the controlling application creates and displays a new record for the user to enter data specific to the controlling application. The dynamic content engine then associates the content object with the record in the controlling application.

Figure 6:
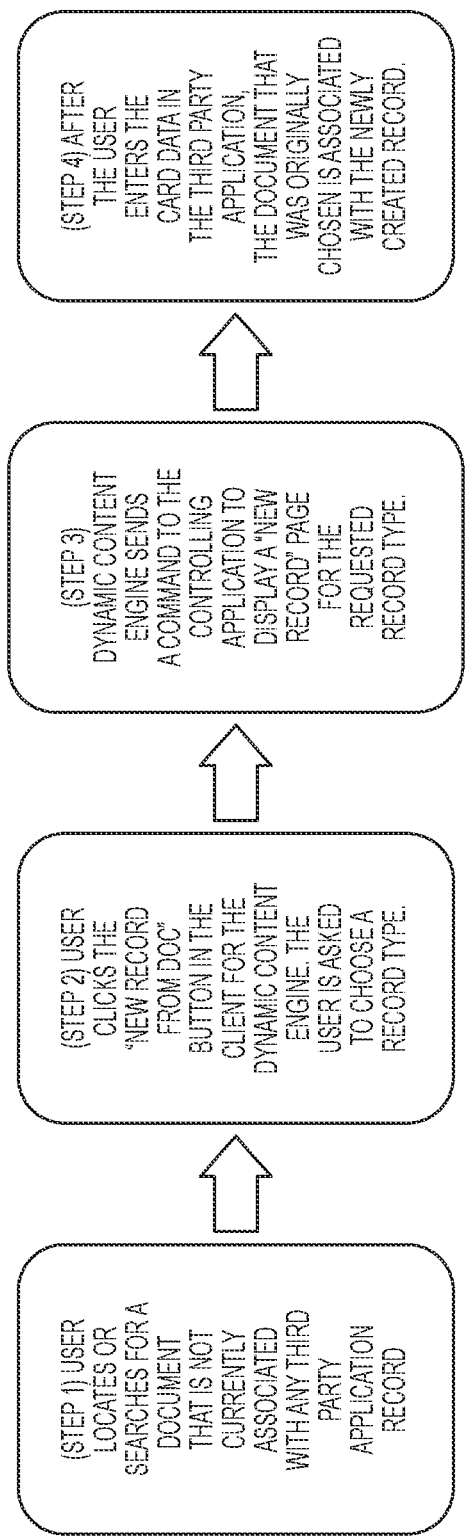
FIG. 6 is an illustration of a process of embodiments of the system.
Figure 7:
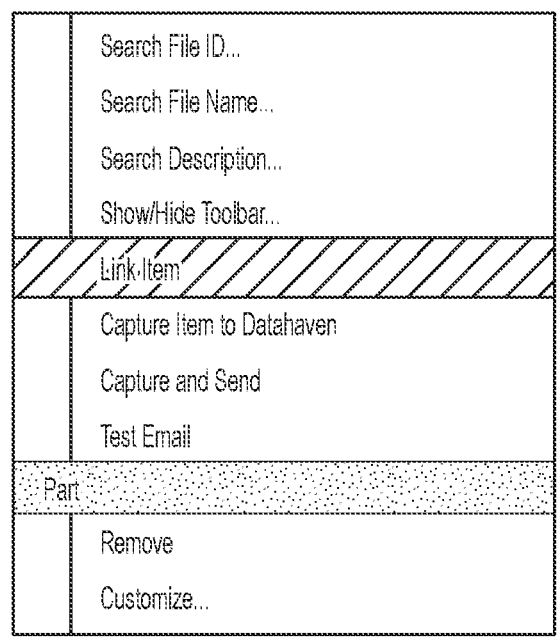
FIG. 7 is an illustration of a user interface of embodiments of the system.

FIG. 6 illustrates a sample process flow of an embodiment of a dynamic content engine. A user searches for and/or locates a document or folder that is not currently associated with any controlling application record (Step 1). The user selects, for example, the "New Record from Doc" option from a user interface associated with the dynamic content engine and the user is prompted to select a record, or card, type (Step 2). In response, the dynamic content engine determines and sends an appropriate command to the controlling application in order for the controlling application to display a "new record" page for the selected record, or card, type (Step 3). As above, in some embodiments, Step 3 may be accomplished by obtaining a bookmark URL from a web service and launching the bookmark URL as a process using a "Process.Start" command as would be appreciated. Once the user enters the data into the new record in the controlling application, the document that was originally chosen in Step 1 is associated with the newly created record (Step 4). In some embodiments, this may be accomplished manually by the user selecting a custom action added to a menu within the controlling application (see e.g., "Actions Menu" in FIG. 7) or automatically when the user saves new record as would be appreciated.

Automatically Capturing and Linking Content Generated by the Controlling Application In some embodiments, to the extent that the controlling application itself has the capability to generate content, such as PDF files, emails, faxes, or printed content, the dynamic content engine automatically links the generated content object to the record that is responsible for creating the content. For example, if the controlling application creates a printed sales invoice, the dynamic content engine captures a file-based copy of the sales invoice and automatically links it to the sales invoice record stored in the repository of the controlling application to which the generated content relates.

Figure 8:
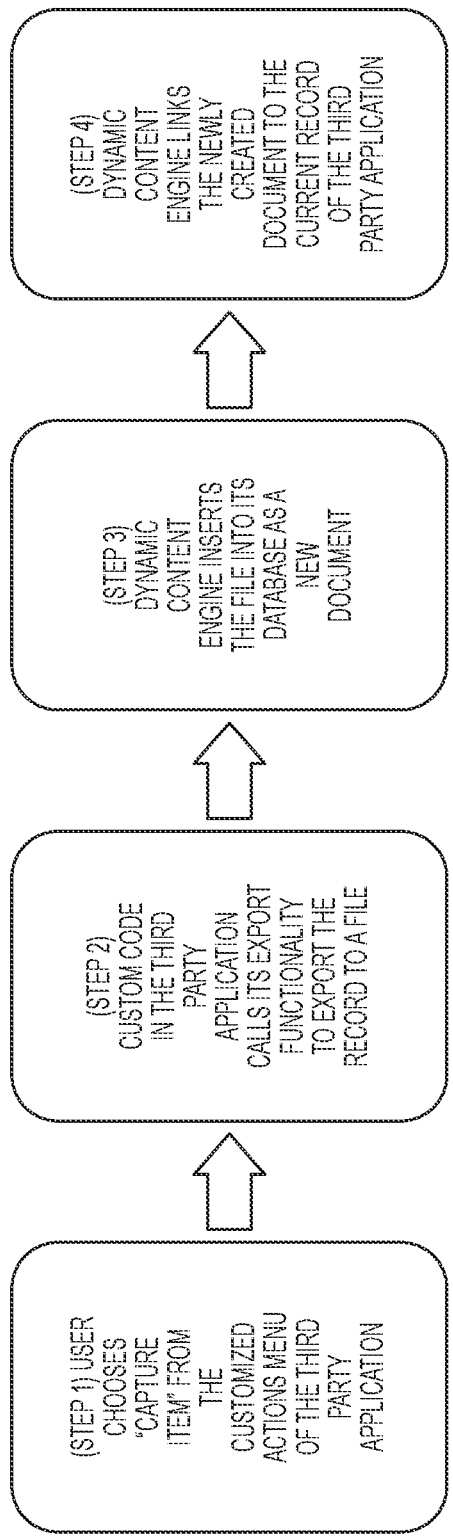
FIG. 8 is an illustration of a process of embodiments of the system.

FIG. 8 illustrates a sample process flow of an embodiment of a dynamic content engine. A user chooses, for example, "Capture Item" from a user interface that corresponds to a custom action added to the controlling application's "Action Menu" (Step 1). Custom code in the controlling application calls the controlling application's export functionality to export the record to a file (Step 2). Once exported, the dynamic content engine inserts the file into its repository as a new content object (Step 3) and links the newly-created content object to the current record of the controlling application (Step 4).

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention.

What is claimed:

1. A method for displaying a content object managed by a content management application to a user of a controlling application comprising:

in response to the user of the controlling application accessing a record in a controlling application repository of the controlling application, receiving, by a dynamic content engine, a notification of the user's access of the record, the notification comprising a primary key and a record type for the record, wherein the dynamic content engine comprises at least one processor, wherein the dynamic content engine couples the content management application to the controlling application, wherein the record is related to the content object;

retrieving, by the dynamic content engine, one or more display commands for the record based on the record type, each display command specifying required data required from the controlling application to display the content object;

retrieving, by the dynamic content engine and from the controlling application repository, data that is associated with the primary key from the controlling application;

retrieving, by the dynamic content engine and from the controlling application repository, related data that is related to the required data; and causing, by the dynamic content engine, the content management application to populate a user interface with the required data and the related data for display to the user and for subsequent access by the user of the content object in the controlling application.

2. The method of claim 1, wherein the content object comprises a document file, an image file, or a video file.

3. The method of claim 1, wherein the content object comprises a folder, wherein the folder comprises a document file, an image file, or a video file.

4. The method of claim 1, further comprising:

in response to the user locating content that does not otherwise exist in the controlling application, instructing the controlling application to create a new record, wherein the instructing further comprises providing a record type to the controlling application, wherein the record type specifies a type of the content; and upon receiving a second primary key for the new record, associating the content with the primary key.

5. The method of claim 1, wherein the user interface visually reflects hierarchical relationships among the records, or the data in the records, in the controlling application.

6. The method of claim 1, wherein the user interface visually reflects direct relationships among the records, or the data in the records, in the controlling application.

7. The method of claim 1, wherein the user interface visually reflects indirect relationships among the records, or the data in the records, in the controlling application.

8. The method of claim 1, further comprising:

in response to the user navigating between a first record reflected in the user interface to a second record in the user interface:

receiving, by the dynamic content engine, a notification of the user's access of the second record, the notification comprising a second primary key about the second record;

retrieving one or more display commands for the second record based on the second primary key, each display command specifying one or more second data required from the controlling application;

retrieving the specified one or more second data from the controlling application;

populating a user interface with the specified one or more second data for display to the user.

9. The method of claim 1, further comprising:

in response to a request by the user, instructing the controlling application to export one or more second data for the record; and inducting the one or more second data; and associating the one or more second data with the primary key.

10. A system for displaying a content object managed by a content management application to a user of a controlling application comprising:
- at least one processor configured to:
  - in response to the user of the controlling application accessing a record in a controlling application repository of the controlling application, receive, by a dynamic content engine, a notification of the user's access of the record, the notification comprising a primary key and a record type for the record, wherein the dynamic content engine comprises at least one processor, wherein the dynamic content engine couples the content management application to the controlling application, wherein the record is related to the content object;
  - retrieve, by the dynamic content engine, one or more display commands for the record based on the record type, each display command specifying required data required from the controlling application to display the content object;
  - retrieve, by the dynamic content engine and from the controlling application repository, data that is associated with the primary key from the controlling application;
  - retrieve, by the dynamic content engine and from the controlling application repository, related data that is related to the required data; and
  - cause, by the dynamic content engine, the content management application to populate a user interface with the required data and the one or more related data for display to the user and for subsequent access by the user of the content object in the controlling application.

11. The system of claim 10, wherein the content object comprises a document file, an image file, or a video file.

12. The system of claim 10, wherein the content object comprises a folder, wherein the folder comprises a document file, an image file, or a video file.

13. The system of claim 10, further comprising:
- in response to the user locating content that does not otherwise exist in the controlling application, instruct the controlling application to create a new record, wherein the instruct further comprises provide a record type to the controlling application, wherein the record type specifies a type of the content; and
- upon receiving a second primary key for the new record, associate the content with the primary key.

14. The system of claim 10, wherein the user interface visually reflects hierarchical relationships among the records, or the data in the records, in the controlling application.

15. The system of claim 10, wherein the user interface visually reflects direct relationships among the records, or the data in the records, in the controlling application.

16. The system of claim 10, wherein the user interface visually reflects indirect relationships among the records, or the data in the records, in the controlling application.

17. The system of claim 10, further comprising:
- in response to the user navigating between a first record reflected in the user interface to a second record in the user interface:
- receive, by the dynamic content engine, a notification of the user's access of the second record, the notification comprising a second primary key about the second record;
- retrieve one or more display commands for the second record based on the second primary key, each display command specifying one or more second data required from the controlling application;
- retrieve the specified one or more second data from the controlling application;
- populate a user interface with the specified one or more second data for display to the user.

18. The system of claim 10, further comprising:
- in response to a request by the user, instruct the controlling application to export one or more second data for the record; and
- induct the one or more second data; and
- associate the one or more second data with the primary key.

* * * * *